(12) United States Patent
Schecter

(10) Patent No.: US 9,509,815 B2
(45) Date of Patent: Nov. 29, 2016

(54) ERGONOMIC CASE FOR A HAND-HELD ELECTRONIC DEVICE

(71) Applicant: Alan H. Schecter, New York, NY (US)

(72) Inventor: Alan H. Schecter, New York, NY (US)

(*) Notice: Subject to any disclaimer, the term of this patent is extended or adjusted under 35 U.S.C. 154(b) by 0 days.

(21) Appl. No.: 14/522,759

(22) Filed: Oct. 24, 2014

(65) Prior Publication Data

US 2016/0119457 A1     Apr. 28, 2016

(51) Int. Cl.
*H04M 1/00* (2006.01)
*H04M 1/02* (2006.01)
*H04B 1/3888* (2015.01)
*H04M 1/18* (2006.01)

(52) U.S. Cl.
CPC ......... *H04M 1/0279* (2013.01); *H04B 1/3888* (2013.01); *H04M 1/185* (2013.01)

(58) Field of Classification Search
USPC ........................................... 455/457.6, 575.8
See application file for complete search history.

(56) References Cited

U.S. PATENT DOCUMENTS

| | | | | |
|---|---|---|---|---|
| 8,548,536 | B1* | 10/2013 | Gunnip | H04M 1/04 248/585 |
| 2012/0267402 | A1* | 10/2012 | Beatty | A45F 3/14 224/218 |
| 2014/0364176 | A1* | 12/2014 | Pintor | H04B 1/385 455/575.6 |
| 2016/0049983 | A1* | 2/2016 | Ripka | H04B 1/3888 455/575.6 |

* cited by examiner

*Primary Examiner* — David Q Nguyen
(74) *Attorney, Agent, or Firm* — Gottlieb, Rackman & Reisman, P.C.

(57) ABSTRACT

A protective ergonomic case for a device, such as a smartphone, a tablet, etc. is provided that includes a bottom surface with a valley sized and shaped to receive one or two fingers of a user. The fingers in the valley provide support for the case and the device while the device is operated by the user with his other hand.

11 Claims, 1 Drawing Sheet

ERGONOMIC CASE FOR A HAND-HELD ELECTRONIC DEVICE

RELATED APPLICATIONS

None

BACKGROUND OF THE INVENTION

A. Field of Invention

This invention pertains to a case for a hand-held device with indentations in the back to provide balance and stability to facilitate holding and using the hand-held device in one hand. The case can be molded in one piece and can optionally include a backup battery and/or other accessories. Alternatively, the device can provide similar functionality and utility by attaching (adhering) the appliance directly to the back side of the device without employing an add on case.

B. Description of the Prior Art

Hand-held devices, such as cell phones, smart phones, digital and smart pad devices and calculators, and so on have become prevalent all over the world recently to the point that hardly anyone walks around nowadays without one. Originally, these devices, especially cell phones, where relatively thick, heavy and narrow devices similar to the receivers for the old, wired telephones. These devices fit easily and very solidly in the hand of a person.

Then, devices were developed with bigger and bigger screens and more and more functionalities. These later devices were fairly flat; however as long as their screens did not exceed approximately 4-4.5 inches, they were still manageable and a person could still hold or cradle them in one hand and operate the devices' keys and navigate the screen functionality either using the thumb on the single hand that is holding the device, or utilizing two thumbs and other fingers of both hands, while holding the device in one or both hands.

However, recently new types of smart cell phones, tablets, phablets, and other larger than previously available smart electronic devices have been developed that can have screens ranging from 4.5 to 6.5 inches and more. Such devices are presently available from Apple, Inc., Samsung, etc. These devices are typically very thin, long and wide. In fact they are now wide enough so that they are somewhat difficult to hold or cradle in one hand, either operating the device with the other hand or especially if one has to operate the device with the same hand in which it is being held or cradled, for example, by pushing various real or virtual buttons, or performing swiping motions on the screen.

The inventor has found in most situations, holding the cell phone or other device steadily becomes a difficult proposition and that operating the device with the same or other hand frequently causes the user to move the cell phone around and, eventually he/she may drop it altogether, breaking the device, interrupting the activity in which the user was engaged (for example, dialing, searching, navigating, texting, responding to e mail, or other similar activities). This problem is endemic for all types of devices, including tablets, calculators, etc.

While cases for cell phones have been made previously in various shapes and form, generally these cases are made to follow the respective contours of the device and are made with thin walls to insure that they do not take too much space, or are not too bulky, often adding protection to the device; but not improving the balance, and ability to cradle the phone in a single hand securely while utilizing real or virtual buttons on the face of the device, or while navigating the display. The primary purpose of these cases is to protect the electronic device and not to assist in the operation of the device itself.

SUMMARY OF THE INVENTION

Accordingly, there is a need in the field for a case that can be provided to protect a respective device and at the same time facilitates its use; or for instance that can be attached to the back side of a device to improve the ability to hold or cradle the device while using it with one or both hands.

Briefly, a case constructed in accordance with this invention includes:

a sidewall configured to at least partially engage and hold the device; and a bottom wall having a valley sized and shaped to receive at least one finger of the user to support the case while the device is being operated by fingers of the same or other hand.

The valley is shaped and positioned along the outside of the bottom wall of the case (obverse side of the device) so that when it rests and is cradled on the fingers of one hand, the thumb of the same hand, or the other hand, can be used to operate the device while the device and case are stabilized and supported by the fingers. Thus the user can operate the now better balanced device without fear that the case and the device will slip off his hand and drop to the floor and break.

In one embodiment, an appropriate valley is formed on a flat member that is then attached either directly to the device or the bottom of a case.

DETAILED DESCRIPTION OF THE INVENTION

Figures 1, 2:
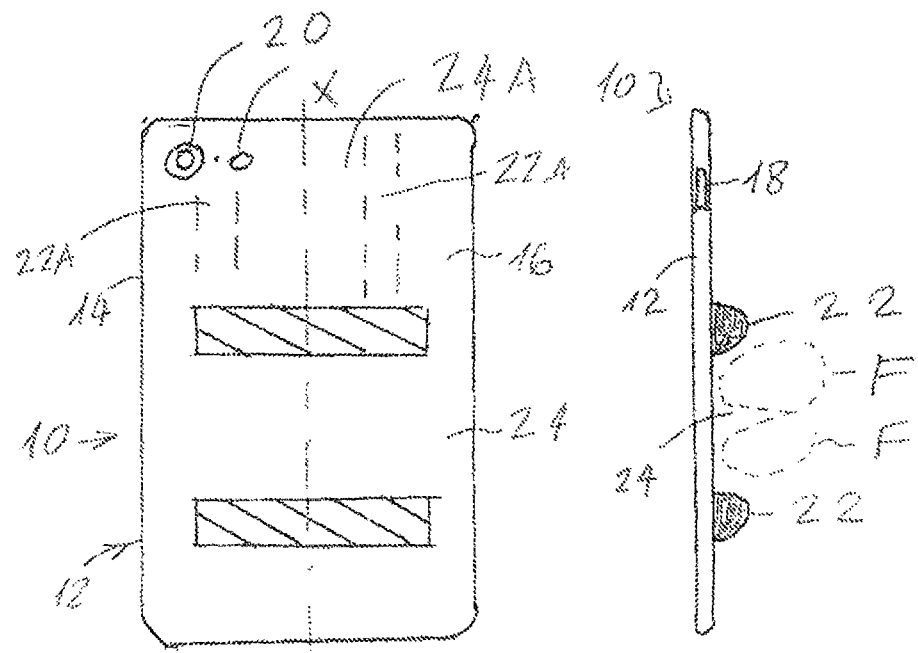
FIG. 1 shows a plan view of the bottom wall of a case constructed in accordance with this invention.
FIG. 2 shows a side view of the case of FIG. 1.

Referring now to FIGS. 1 and 2, a case 10 constructed in accordance with this invention, includes a body 12 having sidewalls 14 and a bottom wall 16 forming a cavity for housing a certain electronic device. The device maybe a cell phone, such as an Iphone 6 or an iphone 6 Plus, a Samsung 4, a tablet, a calculator, or any other hand held device that requires one to do an operation on the face of the device or on a keyboard or virtual keyboard on the face of the device and so on. The case 10 may also have a front portion (not shown) for covering and protecting all or part of the front surface of the device. In addition, the sidewalls 14 may be provided with cutouts 18, buttons (not shown) or other elements necessary or desirable in order to operate the device within the case 10. Bottom wall 16 may have similar cutouts 20 and other elements as well, such as rings through which the fingers of one hand can be inserted to provide the stability and balance while cradling the device in the same single hand.

Importantly, the bottom wall 16 includes a plurality of ribs 22. In the figures, two such ribs 22 are shown however, it may be desirable, in some instances, to provide more than two ribs on the bottom wall 16. The ribs 22 are spaced apart by a predetermined distance selected to form a valley 24. This valley 24 is sized and shaped to accommodate two fingers (typically the pointing and the middle finger, or index and fourth finger) of an average adult person, placed side by side as shown in FIG. 2. Moreover, the ribs 22 are constructed to define a height for the valley that is related to the cross-sectional dimension of the finger of an average person. Alternatively, if the device is intended for a child of a specific age, the width and height of valley 24 is selected to match the finger size of an average child of said specific age.

In FIG. 1, the ribs are shown as having a length that may be about ½ in less than the width of wall 16 and start about ¼ in from the respective side walls 14. Alternatively, the ribs 22 can have the same length as the width of the case 12. In another embodiment, the ribs 22 are much shorter, e.g. about 1-2 in long and can be either disposed near a longitudinal axis of the case 12 or nearer to one of the sidewalls 12, including being shaped to taper into the back of the case itself.

The height of the valley must be sufficient to stop the device from slipping off the fingers F even if the device is held at an angle as it is being operated. This height may be expressed as an actual dimension, or in relation to the cross-sectional dimension of fingers F of an average person. The inventor has found that this height may range from about 0.25 to 0.75 inches and preferably from about 0.3 to about 0.5 in. Alternatively, the height may range from about ¼ to about ¾ of the average thickness of an average person's figure. Of course the case 10 may be customized. That is, cases may be made for adults, in which case the width and depth of the valley 24 is determined based on the average dimensions of average persons, while other cases may be customized for children in a preselected age range, such as 10-12, 12-14, etc. If the valley 34 is shallower then the case 10 with the device may slip off and may feel insecure. If the valley is deeper, the case may be too thick. Preferably the location of the valley 24 is selected so that the center of gravity of device falls in the valley 24.

The ribs 22 can be made of the same material as the case or they can be made of a soft rubbery material. In one embodiment, the ribs 22 can be attached to the device itself rather being part of the case; or alternatively a full back containing the ribs can be temporarily or permanently adhered to the back of the device.

The applicant has found that using a case as described above and illustrated in the FIGS. 1 and 2 is much easier than standard cases without a valley because the device and its case are resting much more securely on the fingers F and the various controls on the face of the device can be operated very effectively without fear that the device will be dropped.

The case 10 can be made with a unitary body including the ribs 22, or the ribs can be added later using an adhesive or other well-known means. The ribs 22 can be full, or can be hollow to reduce the overall weight of the case. The ribs 22 and the case 12 can be made of the same material or different materials.

Moreover, the case and/or the ribs can be made with cavities for housing various accessories or other items.

Figures 3, 4:
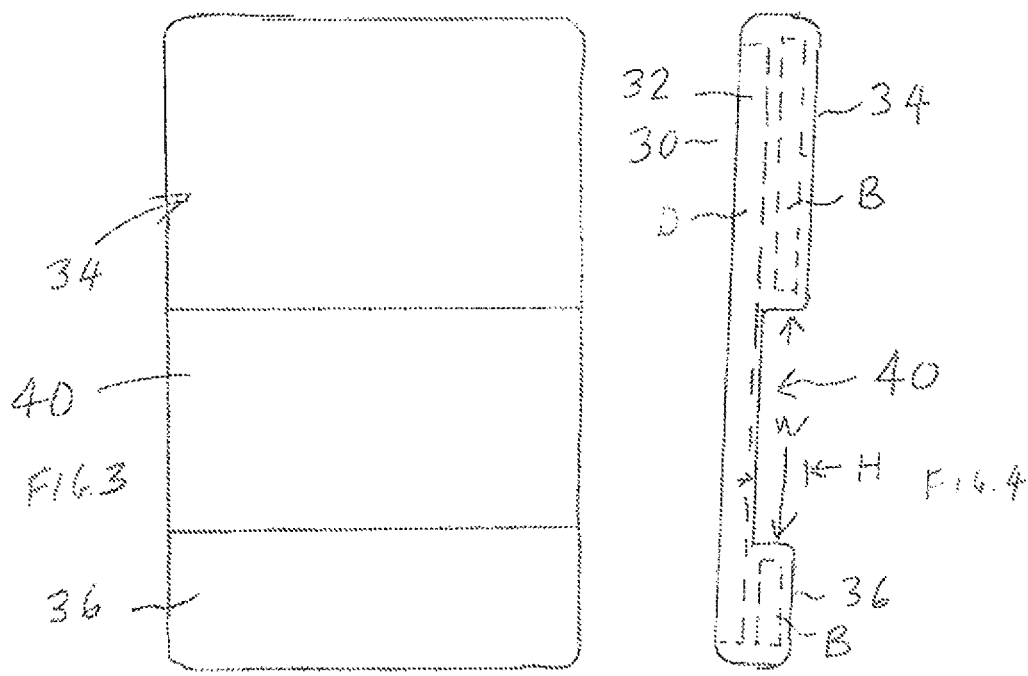
FIG. 3 shows a plan view of the bottom wall of an alternate embodiment.
FIG. 4 shows a side view of the alternate embodiment of FIG. 3.

FIGS. 3 and 4 show another embodiment of the invention illustrating this latter concept. In this Figure, case 30 is much thicker than case 12 and it is adapted to house or protect device D as well as one or more accessories, such as battery B1, B2. Case 30 has sidewalls 32 and two bottom wall portions 34, 36. The bottom wall portions 34, 36 are separated by valley 40. Preferably valley 40 has a height H and a width W that are determined in the same manner as described above for the embodiment of FIGS. 1 and 2.

While the valley 24 in FIGS. 1 and 2 is defined by ribs, other structures may be used, such as a plurality of sequential spaced bumps, each bump having a round or square cross section, etc. Moreover, while in the figures, the valleys 24, 40 extend transversally to a longitudinal axis X-X of the bottom wall, similar valleys may also be provided on the bottom wall that extend in parallel to or collinear with this longitudinal axis. For example ribs 22A shown in FIG. 1 may be provided to define a valley 24A. This configuration is particularly useful for holding the case with the device in a landscape rather than a portrait mode.

In another embodiment, the valley has a width selected to accommodate one or three fingers.

In another embodiment, two valleys are formed on the back of the device, each valley accepting one or two fingers.

In yet another embodiment, the valley is wide enough to accommodate three fingers.

In another embodiment, an accessory is provided similar to the case of FIGS. 1 and 2 but without any sidewall. Instead the accessory has one surface for attachment to the hand-held device directly or to the case, using an adhesive or other conventional means. The other opposite surface is formed with a valley for receiving one or more fingers as discussed above.

Obviously numerous modifications may be made to the invention without departing from its scope as defined in the appended claims.

I claim:

1. A case for holding a device in the hand of a user, said case comprising:
    a sidewall configured to at least partially engage and hold the device; and
    a bottom wall having a first and a second rib extending generally in parallel across said bottom wall, with a valley being defined by said ribs, said valley being sized and shaped to receive at least one finger of the user to support the case while the device is being operated by fingers of the other hand.

2. The case of claim 1 wherein said bottom wall has a flat surface with said first and a second rib extending generally in parallel along said flat surface, with the valley being defined between said ribs.

3. The case of claim 1 wherein said case has a longitudinal axis and the valley is disposed transversally to said longitudinal axis.

4. The case of claim 1 wherein said case has a longitudinal axis and the valley is disposed in parallel to said longitudinal axis.

5. The case of claim 1 wherein said bottom wall has two flat sections and the valley is disposed between said sections.

6. The case of claim 1 wherein said valley has a width selected to accept to fingers of an average user.

7. The case of claim 2 has a center of gravity disposed above said valley.

8. A protective case for a hand-held device, the device being manually operable by a user, said case comprising:
    a bottom wall formed a first and a second rib extending generally in parallel across said bottom wall, with a valley being defined by said ribs, said valley being sized and shaped to receive at least one of the fingers of the user, said valley being positioned on the bottom wall to provide support for the case during the operation of the device by the user.

9. The protective case of claim 8 wherein said bottom wall includes a first section and a second section, with said valley being disposed between said sections.

10. The protective case of claim 9 wherein said case further includes an accessory for the device.

11. The protective case of claim 10 wherein said accessory is a battery.

* * * * *